United States Patent
Wantland et al.

(10) Patent No.: US 12,528,689 B2
(45) Date of Patent: Jan. 20, 2026

(54) AUTOFILL PITCHER WITH ADDITIVE

(71) Applicant: Haier US Appliance Solutions, Inc., Wilmington, DE (US)

(72) Inventors: Louis A. Wantland, Louisville, KY (US); Jordan Andrew Waymeyer, Louisville, KY (US); Jeffrey Michael Colyer, Louisville, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 0 days.

(21) Appl. No.: 18/582,773

(22) Filed: Feb. 21, 2024

(65) Prior Publication Data
US 2025/0263284 A1 Aug. 21, 2025

(51) Int. Cl.
*F25D 23/12* (2006.01)
*B67D 1/00* (2006.01)
*B67D 1/10* (2006.01)
*B67D 1/12* (2006.01)

(52) U.S. Cl.
CPC ......... *B67D 1/0078* (2013.01); *B67D 1/0022* (2013.01); *B67D 1/108* (2013.01); *B67D 1/1202* (2013.01); *F25D 23/12* (2013.01); *F25D 2331/81* (2013.01); *F25D 2700/06* (2013.01)

(58) Field of Classification Search
CPC .... B67D 1/0078; B67D 1/0022; B67D 1/108; B67D 1/1202; F25D 23/12; F25D 2331/81; F25D 2700/06
See application file for complete search history.

(56) References Cited

U.S. PATENT DOCUMENTS

| | | | |
|---|---|---|---|
| 4,703,770 A * | 11/1987 | Arzberger | G07F 13/065 62/391 |
| 6,672,097 B1 * | 1/2004 | Ashley | A23G 9/163 62/340 |
| 7,743,801 B2 * | 6/2010 | Janardhanam | F25D 23/126 141/351 |
| 8,047,401 B2 * | 11/2011 | Holler | B67D 3/0029 222/61 |
| 8,541,039 B2 * | 9/2013 | Lackey | C02F 1/003 99/275 |
| 8,556,127 B2 * | 10/2013 | Olson | B67D 1/10 222/162 |
| 11,350,786 B2 * | 6/2022 | Park | A47J 31/525 |

(Continued)

FOREIGN PATENT DOCUMENTS

AU 2021107313 A4 12/2021

*Primary Examiner* — Nicolas A Arnett
(74) *Attorney, Agent, or Firm* — Dority & Manning, P.A.

(57) ABSTRACT

An autofill pitcher system includes a pitcher and a dispenser. The pitcher includes at least one pitcher wall and an internal volume defined within the at least one pitcher wall. The dispenser defines a cavity. The cavity is configured to receive the pitcher. The dispenser also includes a fill tube and a pod receiver. The fill tube is positioned and configured to direct a flow of water from a water supply into the internal volume of the pitcher when the pitcher is received within the cavity. The pod receiver is configured to hold a pod containing an additive. The pod receiver is in fluid communication with the internal volume of the pitcher whereby the dispenser is configured to provide the additive to the internal volume of the pitcher.

12 Claims, 11 Drawing Sheets

(56) References Cited

U.S. PATENT DOCUMENTS

| | | | | |
|---|---|---|---|---|
| 2005/0103721 | A1* | 5/2005 | Fritze | C02F 9/20 |
| | | | | 210/744 |
| 2006/0021919 | A1* | 2/2006 | Olson | B01F 35/213 |
| | | | | 210/85 |
| 2006/0191824 | A1* | 8/2006 | Arett | C02F 1/003 |
| | | | | 210/473 |
| 2007/0089450 | A1* | 4/2007 | Janardhanam | F25D 23/126 |
| | | | | 62/340 |
| 2012/0102998 | A1* | 5/2012 | Chase | F25D 23/126 |
| | | | | 222/129.1 |
| 2016/0205988 | A1* | 7/2016 | Bird | F25D 23/12 |
| 2017/0057803 | A1* | 3/2017 | McKinney | F25D 23/12 |
| 2018/0344076 | A1* | 12/2018 | Roy | A47J 31/46 |
| 2022/0221212 | A1* | 7/2022 | Carr | F25C 5/22 |
| 2022/0240712 | A1* | 8/2022 | Chernov | A47J 31/469 |
| 2022/0369852 | A1* | 11/2022 | Abeygunawardana | |
| | | | | A47J 31/446 |
| 2023/0108527 | A1* | 4/2023 | Junge | F25D 1/02 |
| | | | | 99/323.2 |

* cited by examiner

AUTOFILL PITCHER WITH ADDITIVE

FIELD OF THE INVENTION

The present subject matter relates generally to refrigerator appliances, and more particularly to autofill water dispensing systems for refrigerator appliances.

BACKGROUND OF THE INVENTION

Some refrigerator appliances include autofill dispensing systems. Autofill dispensing systems typically include a dispensing housing and a pitcher. When the pitcher is positioned in a designated spot, e.g., beneath the autofill housing, water is automatically dispensed into the pitcher.

Some users prefer water with an additive, such as flavorant, electrolytes, vitamins, and/or other similar additives. Typically, such additives are manually mixed with a volume of water. Manual mixing may be inconvenient, messy, and may result in uneven mixing of the water and additive, e.g., too much or too little flavor in one batch or another.

Accordingly, an autofill dispensing system in a refrigerator that includes features for automatically mixing water with an additive would be desirable.

BRIEF DESCRIPTION OF THE INVENTION

Aspects and advantages of the invention will be set forth in part in the following description, may be apparent from the description, or may be learned through practice of the invention.

In one exemplary aspect, a refrigerator appliance is provided. The refrigerator appliance includes a cabinet. The cabinet defines a fresh food chamber. The refrigerator appliance also includes an autofill pitcher system. The autofill pitcher system includes a pitcher and a dispenser. The pitcher includes at least one pitcher wall and an internal volume defined within the at least one pitcher wall. The dispenser defines a cavity. The cavity is configured to receive the pitcher. The dispenser also includes a fill tube and a pod receiver. The fill tube is positioned and configured to direct a flow of water from a water supply into the internal volume of the pitcher when the pitcher is received within the cavity. The pod receiver is configured to hold a pod containing an additive. The pod receiver is in fluid communication with the internal volume of the pitcher whereby the dispenser is configured to provide the additive to the internal volume of the pitcher.

In another example aspect, an autofill pitcher system is provided. The autofill pitcher system includes a pitcher and a dispenser. The pitcher includes at least one pitcher wall and an internal volume defined within the at least one pitcher wall. The dispenser defines a cavity. The cavity is configured to receive the pitcher. The dispenser also includes a fill tube and a pod receiver. The fill tube is positioned and configured to direct a flow of water from a water supply into the internal volume of the pitcher when the pitcher is received within the cavity. The pod receiver is configured to hold a pod containing an additive. The pod receiver is in fluid communication with the internal volume of the pitcher whereby the dispenser is configured to provide the additive to the internal volume of the pitcher.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first," "second," and "third" may be used interchangeably to distinguish one component from another and are not intended to signify location or importance of the individual components. The terms "includes" and "including" are intended to be inclusive in a manner similar to the term "comprising." Similarly, the term "or" is generally intended to be inclusive (i.e., "A or B" is intended to mean "A or B or both"). In addition, here and throughout the specification and claims, range limitations may be combined and/or interchanged. Such ranges are identified and include all the sub-ranges contained therein unless context or language indicates otherwise. For example, all ranges disclosed herein are inclusive of the endpoints, and the endpoints are independently combinable with each other. The singular forms "a," "an," and "the" include plural references unless the context clearly dictates otherwise.

Approximating language, as used herein throughout the specification and claims, may be applied to modify any quantitative representation that could permissibly vary without resulting in a change in the basic function to which it is related. Accordingly, a value modified by a term or terms, such as "generally," "about," "approximately," and "substantially," are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 10 percent margin, i.e., including values within ten percent greater or less than the stated value. In this regard, for example, when used in the context of an angle or direction, such terms include within ten degrees greater or less than the stated angle or direction, e.g., "generally vertical" includes forming an angle of up to ten degrees in any direction, e.g., clockwise or counterclockwise, with the vertical direction V.

The word "exemplary" is used herein to mean "serving as an example, instance, or illustration." In addition, references to "an embodiment" or "one embodiment" does not necessarily refer to the same embodiment, although it may. Any implementation described herein as "exemplary" or "an embodiment" is not necessarily to be construed as preferred or advantageous over other implementations. Moreover, each example is provided by way of explanation of the invention, not limitation of the invention. In fact, it will be apparent to those skilled in the art that various modifications and variations can be made in the present invention without departing from the scope of the invention. For instance, features illustrated or described as part of one embodiment can be used with another embodiment to yield a still further embodiment. Thus, it is intended that the present invention covers such modifications and variations as come within the scope of the appended claims and their equivalents.

Figure 1:
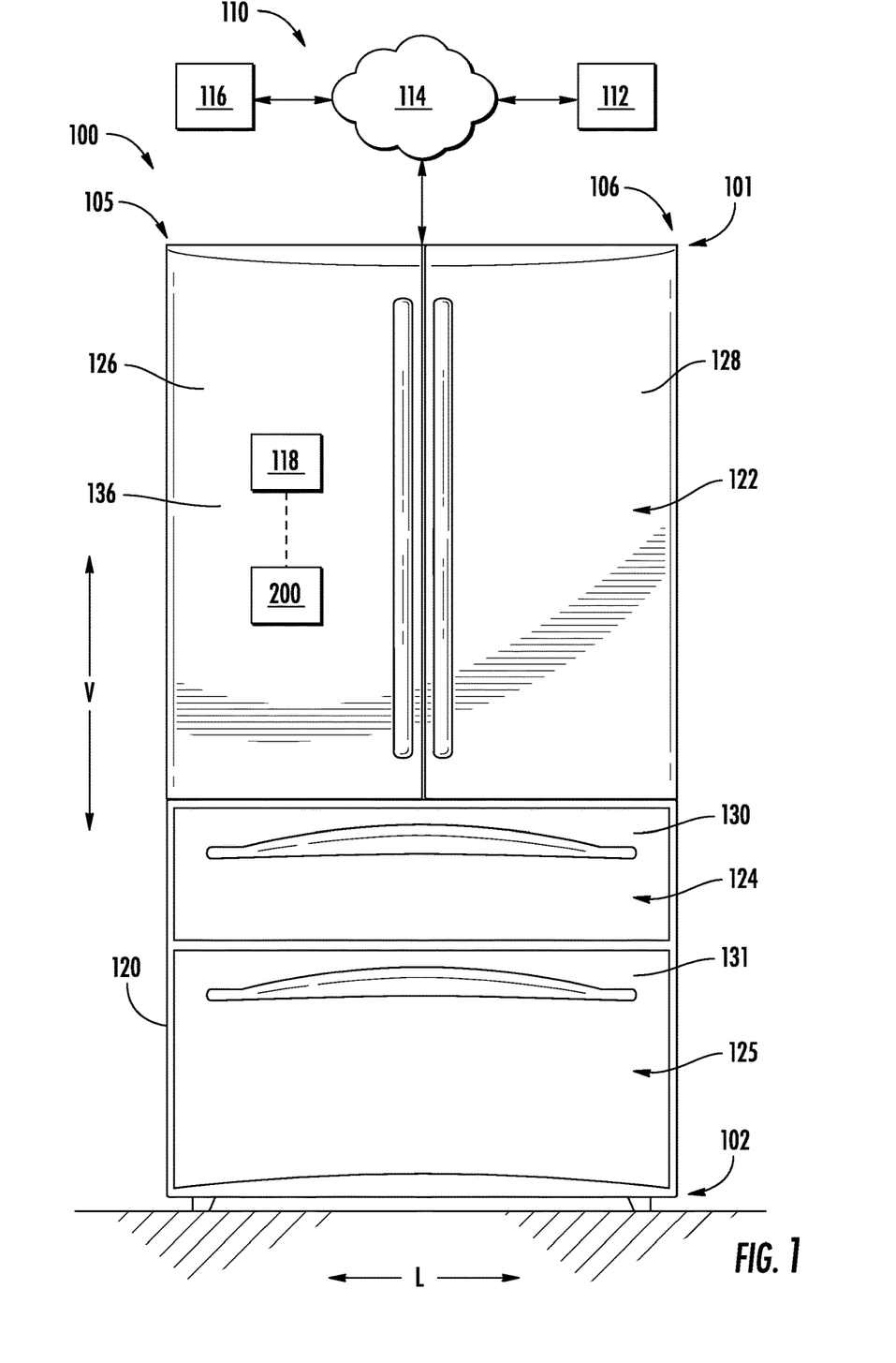
FIG. 1 provides a front view of a refrigerator appliance according to one or more exemplary embodiments of the present disclosure.

Turning to the figures, FIG. 1 provides a front view of an exemplary refrigerator appliance 100 according to one or more exemplary embodiments of the present disclosure. Refrigerator appliance 100 extends between a top 101 and a bottom 102 along a vertical direction V, between a left side 105 and a right side 106 along a lateral direction L, and extends between a front and a back along a transverse direction T (not shown), which is a direction orthogonal to the vertical direction V and the lateral direction L. Vertical direction V, lateral direction L, and transverse direction T are mutually perpendicular and form an orthogonal direction system.

Refrigerator appliance 100 includes a housing or cabinet 120 defining a chilled chamber, fresh food chamber 122, and one or more freezer chambers, such as a first freezer chamber 124 and a second freezer chamber 125, which may both be arranged below fresh food chamber 122 along the vertical direction V. In additional embodiments, the middle chamber may be a flexible chamber in place of first freezer chamber 124 and may be selectively operable at various temperatures for storing any desired food items, such as produce, wine, etc. As illustrated, fresh food chamber 122 is bounded by vertical walls at the left side 105 and at the right side 106, such walls spaced apart in the lateral direction, a horizontal wall at the top 101 and at the bottom by a lower wall 132. In this configuration, refrigerator appliance 100 may generally be referred to as a bottom mount, or bottom freezer, refrigerator. Cabinet 120 also defines a mechanical compartment (not shown) for receipt of a sealed cooling system (not shown).

Left and right refrigerator doors 126, 128, respectively, are rotatably hinged to an edge of cabinet 120 at left 105 and right 106 sides, respectively, for accessing fresh food chamber 122 (FIG. 2) or sealing fresh food chamber 122 as illustrated in FIG. 1. For example, upper and lower hinges may couple each door 126, 128 to cabinet 120. When left and right doors 126, 128 are configured as illustrated in FIG. 1, the door arrangement is sometimes referred to as a "French door" configuration. Freezer doors, such as a first freezer door 130 and a second freezer door 131, may be arranged below refrigerator doors 126, 128 for accessing one or more freezer chambers, such as first and second freezer chambers 124, 125, respectively. In the exemplary embodiment shown in FIG. 1, freezer doors 130, 131 are coupled to freezer drawers (not shown) slidably mounted within first and second freezer chambers 124, 125. Such drawers are thus generally "pull-out" drawers in that they can be manually moved into and out of freezer chambers 124, 125 on suitable slide mechanisms. Each door 126, 128, 130, 131 can include a handle for accessing one of the chambers 122, 124, 125 of refrigerator appliance 100.

Referring still to FIG. 1, a schematic diagram of an external communication system 110 will be described according to an exemplary embodiment of the present subject matter. In general, external communication system 110 is configured for permitting interaction, data transfer, and other communications between appliance 100 and one or more external devices. For example, this communication may be used to provide and receive operating parameters, user instructions or notifications, performance characteristics, user preferences, or any other suitable information for improved performance of appliance 100. In addition, it should be appreciated that external communication system 110 may be used to transfer data or other information to improve performance of one or more external devices or appliances and/or improve user interaction with such devices.

For example, external communication system 110 permits controller 200 of appliance 100 to communicate with a separate device external to appliance 100, referred to generally herein as an external device 112. As described in more detail below, these communications may be facilitated using a wired or wireless connection, such as via a network 114. In general, external device 112 may be any suitable device separate from appliance 100 that is configured to receive communications, information, or data from the controller 200 regarding the operation of refrigerator appliance 100, or provide commands from a user to the controller 200 of the refrigerator appliance 100. In this regard, external device 112 may be, for example, a personal phone, a smartphone, a tablet, a laptop or personal computer, a wearable device, a smart home system, or another mobile or remote device. Controller 200 is in operative communication with external device 112 through network 114 of external communication system 110.

In addition, a remote server 116 may be in communication with appliance 100 and/or external device 112 through network 114. In this regard, for example, remote server 116 may be a cloud-based server 116, and is thus located at a distant location, such as in a separate state, country, etc., from the appliance 100. In additional embodiments, the remote server 116 may be in the fog or the edge instead of the cloud. According to an exemplary embodiment, external device 112 may communicate with a remote server 116 over network 114, such as the Internet, to transmit/receive data or information, provide user inputs, receive user notifications or instructions, interact with or control appliance 100, etc. In addition, external device 112 and remote server 116 may communicate with appliance 100 to communicate similar information.

In general, communication between appliance 100, external device 112, remote server 116, and/or other user devices or appliances may be carried using any type of wired or wireless connection and using any suitable type of communication network, non-limiting examples of which are provided below. For example, external device 112 may be in direct or indirect communication with appliance 100 through any suitable wired or wireless communication connections or interfaces, such as network 114. For example, network 114 may include one or more of a local area network (LAN), a wide area network (WAN), a personal area network (PAN), the Internet, a cellular network, any other suitable short- or long-range wireless networks, etc. In addition, communications may be transmitted using any suitable communications devices or protocols, such as via Wi-Fi®, Bluetooth®, Zigbee®, wireless radio, laser, infrared, Ethernet type devices and interfaces, etc. In addition, such communication may use a variety of communication protocols (e.g., TCP/IP, HTTP, SMTP, FTP), encodings or formats (e.g., HTML, XML), and/or protection schemes (e.g., VPN, secure HTTP, SSL).

External communication system 110 is described herein according to an exemplary embodiment of the present subject matter. However, it should be appreciated that the exemplary functions and configurations of external communication system 110 provided herein are used only as examples to facilitate description of aspects of the present subject matter. System configurations may vary, other communication devices may be used to communicate directly or indirectly with one or more associated appliances, other communication protocols and steps may be implemented, etc. These variations and modifications are contemplated as within the scope of the present subject matter.

Figure 2:
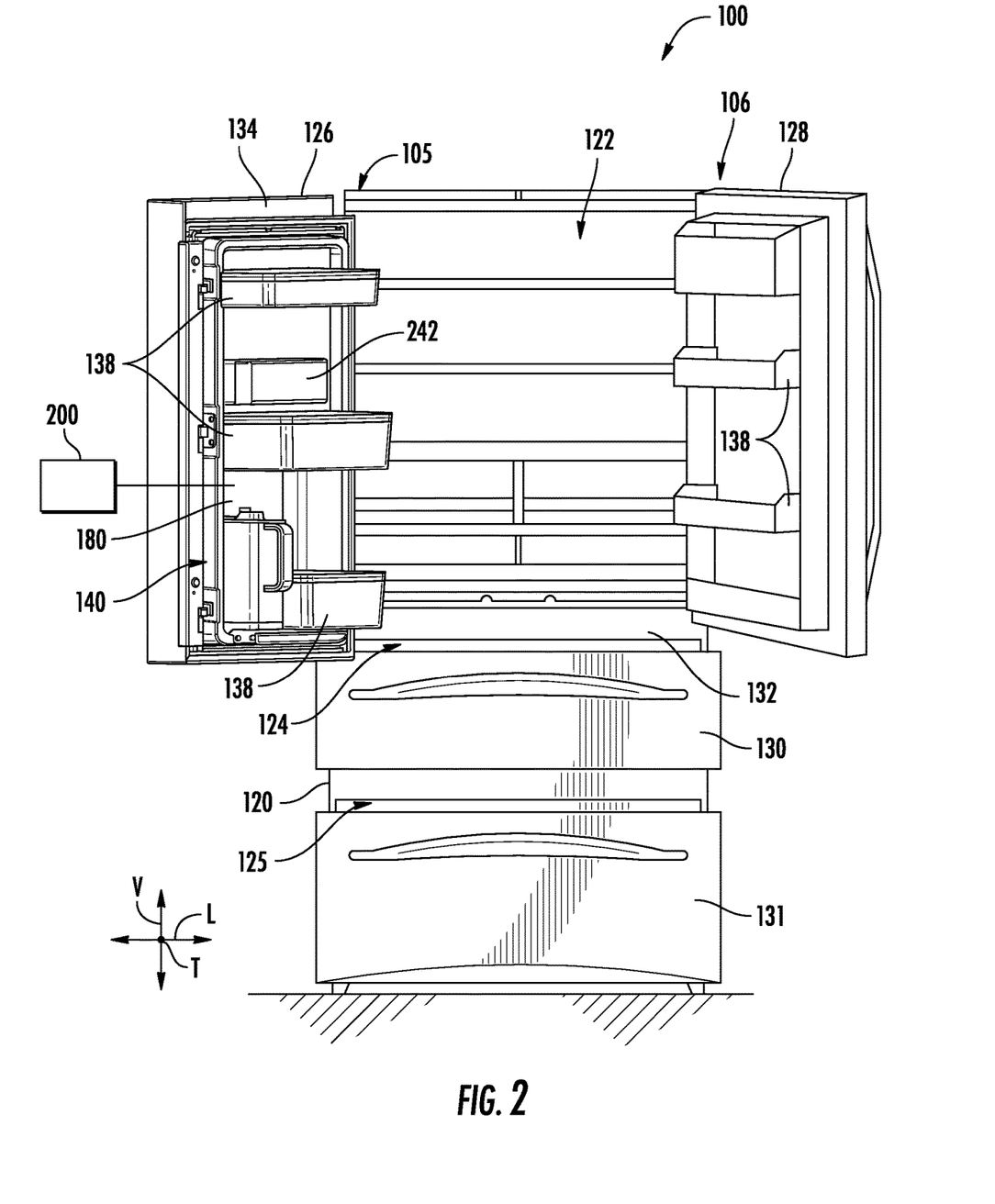
FIG. 2 provides a front view of the refrigerator appliance of FIG. 1 with refrigerator doors shown in an open configuration.

FIG. 2 provides a front perspective view of refrigerator appliance 100 showing refrigerator doors 126, 128 in an open position to reveal the interior of fresh food chamber 122. Additionally, freezer doors 130, 131 are shown in partially open positions to reveal a portion of the interior of freezer chambers 124, 125, respectively.

Left door 126 of refrigerator appliance 100 includes an inner surface 134 and an outer surface 136. Inner surface 134 generally defines a portion of the interior of fresh food chamber 122 when door 126 is in a closed position as shown in FIG. 1. Outer surface 136 is generally opposite inner surface 134 and defines a portion of the exterior of refrigerator appliance 100 when door 126 is in the closed position.

The same construction may result in a similarly formed right door 128 as left door 126, with inner surface 134 and outer surface 136. Moreover, it will further be appreciated that freezer doors 130, 131 can likewise include inner and outer surfaces.

Doors 126, 128 may include storage bins or shelves 138 movably or fixedly attached to the inner surface 134 of the doors 126, 128. In the embodiment illustrated in FIG. 2, left door 126 includes an autofill pitcher system 140 in accordance with this disclosure. An access door 242 may be provided proximate to the autofill pitcher system 140, e.g., on the left door 126 in embodiments where the autofill pitcher system 140 is provided on the left door 126. Components of the autofill pitcher system 140 may be positioned behind the access door 242, such as a water filter (not shown) and/or a pod receiver 190 (see, e.g., FIGS. 5-7 and 10). As will be described in further detail below, the pod receiver 190 may be configured to hold a pod containing an additive, e.g., flavorant. Thus, the pod receiver 190 may be accessible through the access door 242 in order to place, remove, and/or replace one or more additive pods in the pod receiver 190. The autofill pitcher system 140 is illustrated on the left door 126 for convenience. In other embodiments, the autofill pitcher system 140 may be in a different position on the left door 126, or on the right door 128, or elsewhere within the fresh food chamber 122.

It will be appreciated that the present subject matter can be used with other types of refrigerator appliances as well, such as top mount, or top freezer, refrigerator appliances or single door refrigerators, among other possible variations.

Consequently, the description set forth herein is not intended to limit the present subject matter in any aspect.

Figure 3:
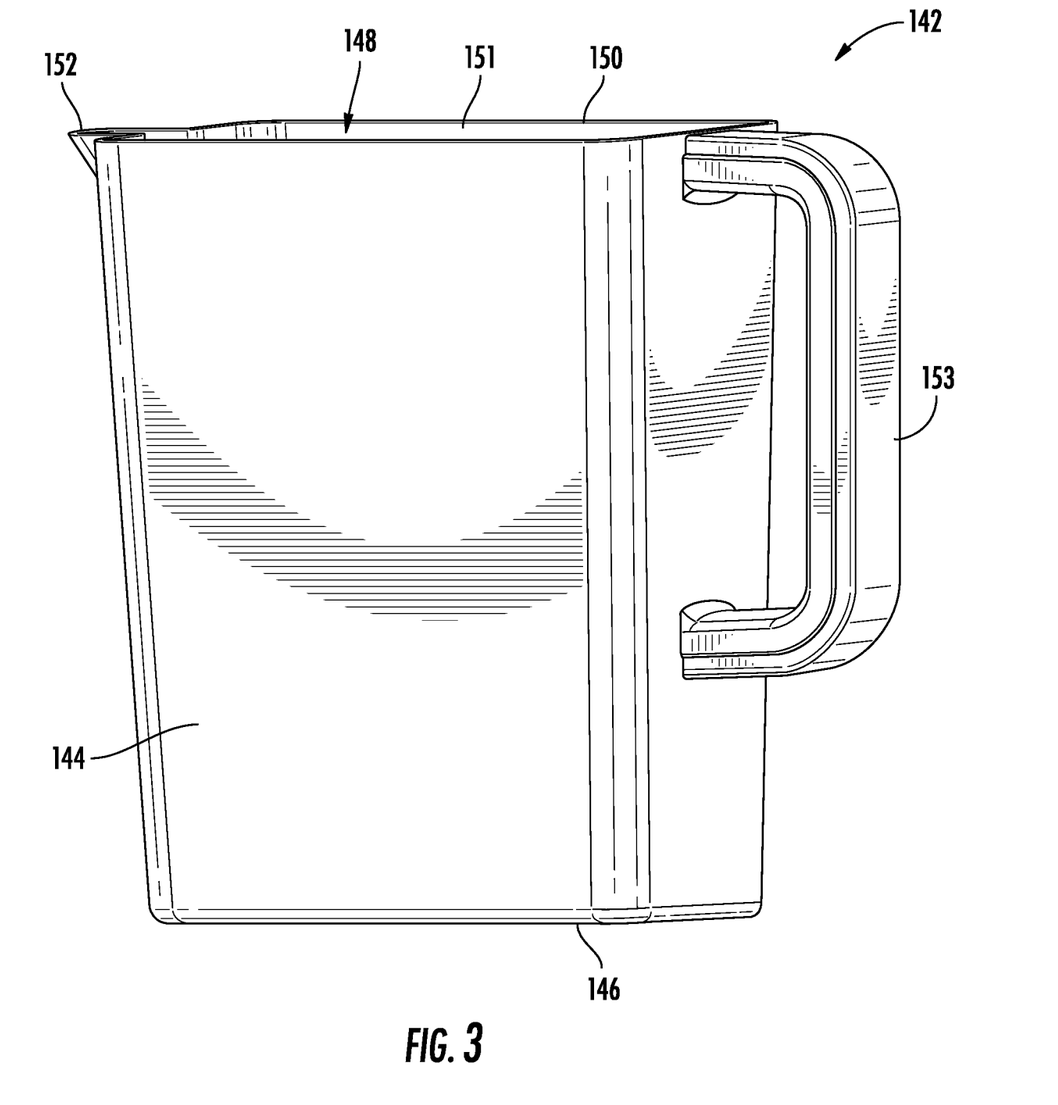
FIG. 3 provides a perspective view of a pitcher in accordance with one or more exemplary embodiments of the present disclosure.

The autofill pitcher system 140 comprises a removable pitcher, pitcher 142, a dispenser 180, and controller 200. Further details of exemplary pitcher 142 may be seen with reference to FIGS. 3, 4, 5, and 7. FIG. 3 is a perspective view of a representative pitcher 142 comprising a pitcher wall 144 connected to, or formed with, pitcher bottom 146. In the illustrated exemplary embodiment, the pitcher wall 144 is a single continuous side wall which extends completely around the outermost perimeter of the pitcher bottom 146 and extends upward from the pitcher bottom 146 generally along the vertical direction V. It should be understood that references herein throughout to the orthogonal direction system including vertical direction V, lateral direction L, and transverse direction T in the context of the pitcher 142 are with reference to when the pitcher 142 is docked in the dispenser cavity 181 and, in embodiments where the autofill pitcher system 140 is provided on a door of the refrigerator appliance, the door is in the closed position.

A top edge 150 is formed by the pitcher wall 144 at the pitcher end opposite pitcher bottom 146. The pitcher wall 144 and pitcher bottom 146 define an internal volume of the pitcher 142, i.e., a pitcher volume 148, accessible through opening 151 defined by the top edge 150. In additional embodiments, the pitcher 142 may include a plurality of side walls which collectively extend completely around the outermost perimeter of the pitcher bottom 146 and thereby define the internal volume of the pitcher 142, e.g., pitcher volume 148 may be enclosed on four sides (such as front, back, left, and right) by one or more side walls and on a fifth side (e.g., bottom) by the pitcher bottom 146, and the pitcher volume 148 may be open on the sixth side, e.g., at the top edge 150.

For convenience, top edge 150 may also define a spout 152 at a first end of the pitcher 142 to facilitate directing liquid into, or out of, the pitcher 142. At a second end of the pitcher, opposite the spout 152, a handle 153 may be included to provide a gripping area to aid in manipulating the pitcher 142.

Exemplary pitcher 142 is illustrated as a generally hollow rectangular cuboid for ease of illustration only. Other embodiments may have other shapes, for example a hollow cylinder, or may be non-prismatic, among other possible examples, and may or may not have features such as a spout or a handle.

Figure 4:
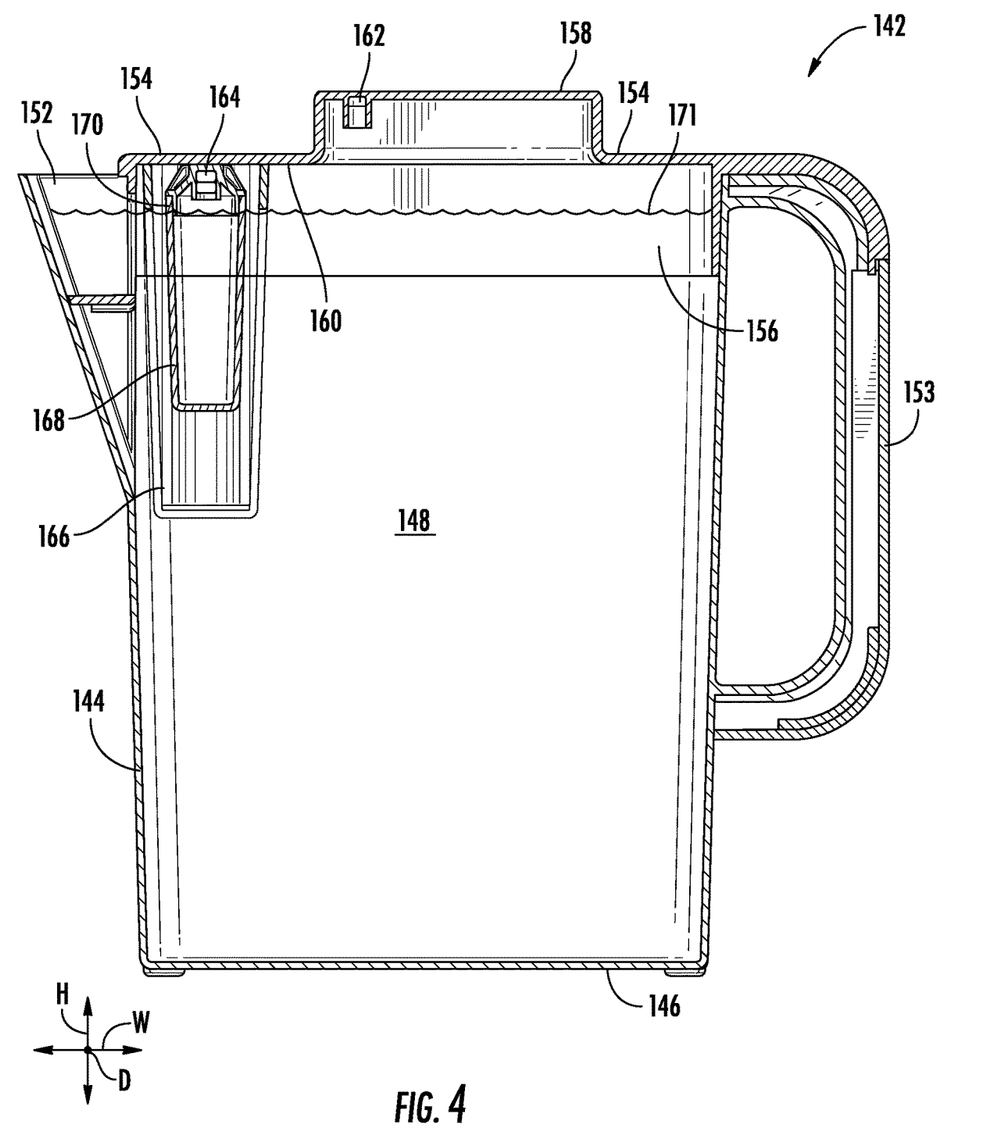
FIG. 4 provides an enlarged side sectional view of a pitcher and lid in accordance with one or more exemplary embodiments of the present disclosure.

As illustrated in FIG. 4, embodiments of pitcher 142 may include a lid 154 removably received in, and fitted to, the opening 151 at the top edge 150. The lid 154 may include a peripheral skirt 156 configured to be removably received in the opening 151 of pitcher 142. Some embodiments of the skirt 156 may include features (not shown) that engage an inner portion of pitcher wall 144 at the top edge 150 to secure the lid against accidental separation from the pitcher 142, such as one or more gaskets, tabs, and/or ridges which extend at least partially around the skirt 156 and engage or interact with the inner surface of one or more side walls of the pitcher 142. Lid 154 may include a top wall 158 joined to, or formed with, the skirt 156. Thus, the lid 154, and in particular the top wall 158 thereof, may cooperate with the pitcher 142 to fully enclose the internal volume 148 when the lid 154 is received in the opening 151.

In accordance with embodiments of this disclosure, lid 154 may include a channel 166 affixed to, or formed with, lid 154. Channel 166 is generally cylindrical in shape with the longitudinal axis generally parallel to the vertical direction V (as noted above, such direction is with reference to when the pitcher 142 is received in the cavity of the dispenser). The wall of the cylindrical channel 166 may be perforated or sections removed to allow fluid communication with the pitcher volume 148. In embodiments, water contained in the pitcher volume 148 can freely enter into, and flow out of, the channel 166.

Float body 168 is illustrated as a generally cylindrical body for ease of illustration. Other shapes for the float body may be used as will be apparent. Float body 168 is disposed inside channel 166 and constrained for displacement, i.e., to allow free or generally free movement, in the vertical direction V. Float body 168 may move vertically between a first position in which the first end 170 of float body 168 is proximate to the inner surface 160 of lid 154 (FIG. 4) and a second position (not shown) where the first end 170 is spaced apart from the inner surface 160.

Float body 168 is a generally hollow structure formed or sealed to be at least liquid tight against intrusion of liquid (e.g., water). The float body 168 is configured to rise generally in the vertical direction V in reaction to the fluid level 171 in the internal volume 148 of the pitcher 142. For example, in FIG. 4, fluid level 171 is at a maximum desirable or full pitcher level and the float body 168 is at the first position, an upper position due to the buoyancy of the float body 168 in the liquid (e.g., water). A sensor trigger 164, e.g., a magnet, may be positioned in the first end 170 of float body 168. For example, the magnet may interact with a reed switch when the pitcher 142 is received in the cavity of the dispenser and the fluid level 171 is at the full pitcher level to indicate the pitcher is full and a fill operation may be stopped. In additional embodiments, any suitable sensor and sensor trigger may be used as well as or instead of the exemplary magnet and/or reed switch.

Figure 5:
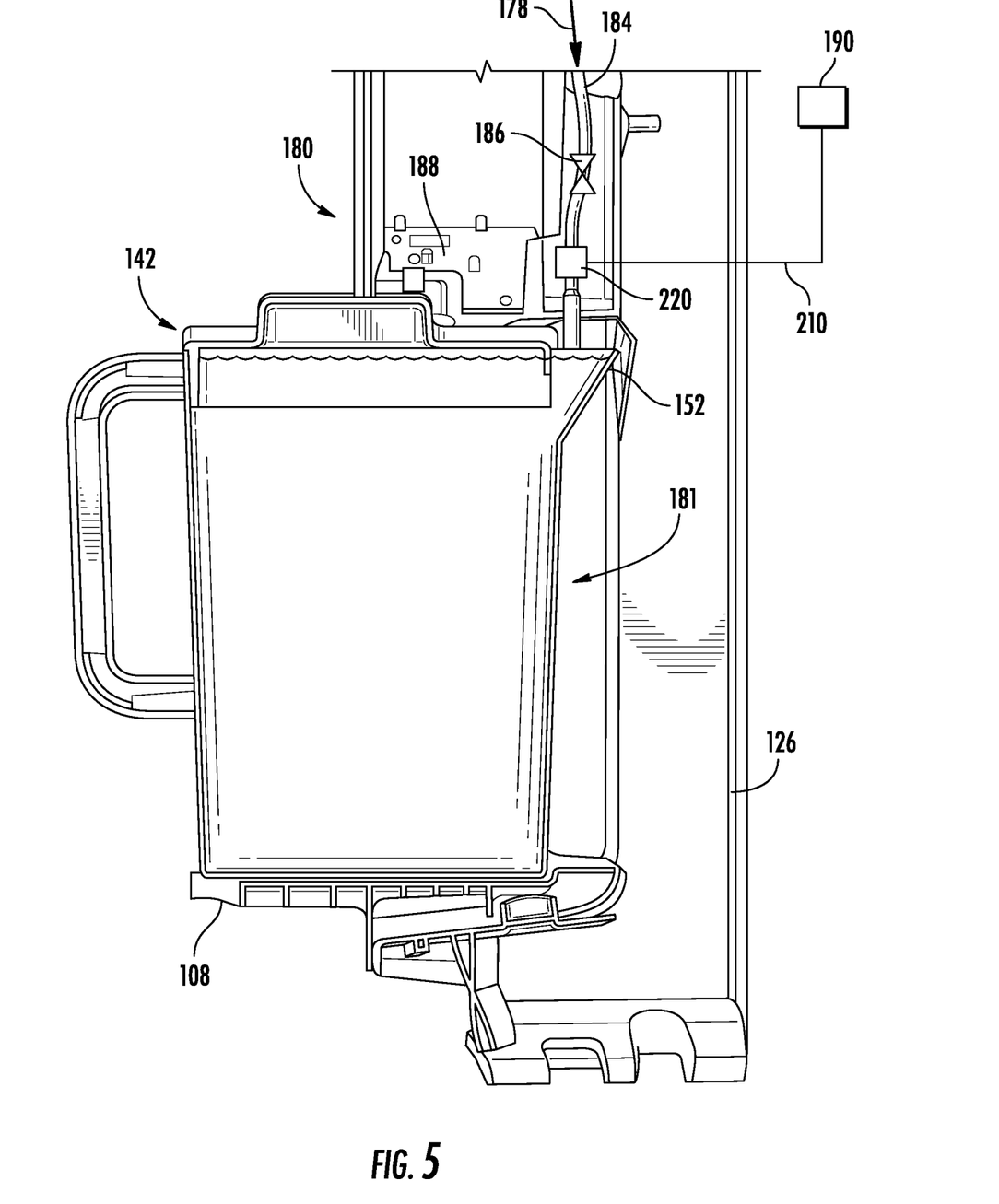
FIG. 5 provides an illustrative view of a pitcher received in a dispenser cavity in accordance with one or more exemplary embodiments of the present disclosure.
Figure 7:
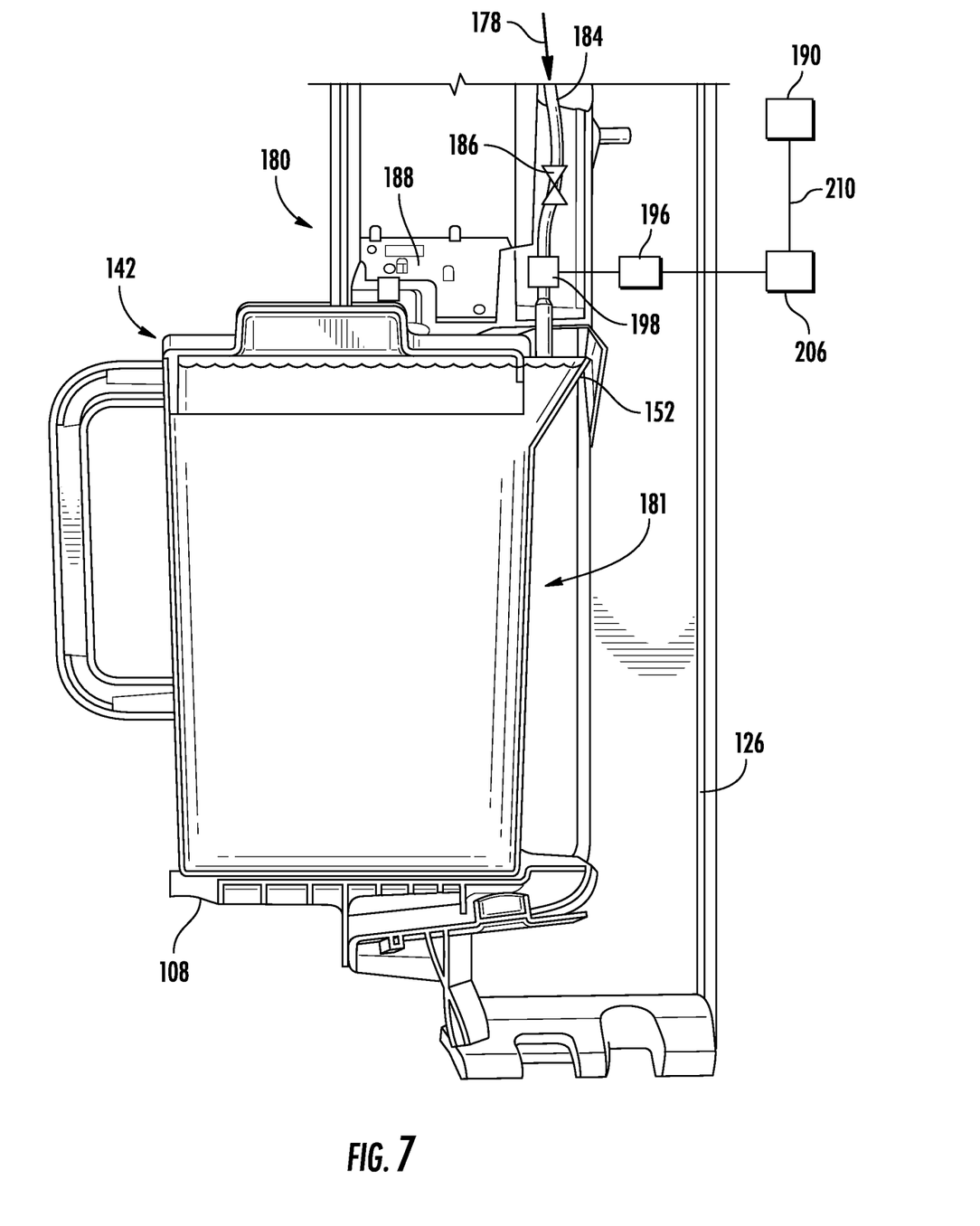
FIG. 7 provides an illustrative view of a pitcher received in a dispenser cavity in accordance with one or more additional exemplary embodiments of the present disclosure.

As illustrated for example in FIGS. 5 and 7, dispenser 180 defines a cavity 181 to receive the pitcher 142. In the illustrative embodiment shown in the figures, the dispenser 180 is positioned on the inner surface 134 of left door 126 of the refrigerator appliance 100. Other embodiments may have the dispenser on other doors or elsewhere in the fresh food chamber 122. As illustrated, the cavity 181 comprises a support or shelf 108 to support the pitcher 142 in the vertical direction V and a sensor board 188 adjacent to the lid 154 of the pitcher 142. As illustrated, the shelf 108 is dedicated to support the pitcher 142 on the left door 126. In other embodiments, the shelf 108 may not be a dedicated shelf for the pitcher 142. The shelf 108 may have other or additional uses, for example storage of other food products on the door. In other embodiments, the shelf 108 may be within the cabinet 120. Other features (not shown) may be provided to secure the pitcher 142 in the cavity 181 during filling and as the door 126 is open and closed to provide access to the fresh food chamber 122.

The dispenser 180 may include a fill tube 184 adapted to direct water from a water supply 178 to the pitcher 142. The water supply 178 may be, for example, a water utility supply or a private source water supply, such as a private well. A valve 186 may be provided in line with the fill tube 184 between the water supply and the pitcher 142 to selectively allow the flow of water to the pitcher 142. The valve is operatively coupled to the controller 200.

Controller 200 (FIGS. 1 and 2) controls the operation of the autofill pitcher system in that it interprets signals received from various sensors of the dispenser 180 and determines if the autofill operation should initiate and when it should stop. Controller 200 may include control circuits, a memory, clock(s), an input/output device such as user interface 118 (FIG. 1), and a microprocessor, such as a general purpose or special purpose microprocessor operable to execute programming instructions or micro-control code associated with the operation of the autofill pitcher system. Alternatively, controller 200 may be constructed without using a microprocessor, e.g., using a combination of discrete analog or digital logic circuitry to perform control functionality instead of relying on software.

In the exemplary embodiment illustrated in FIGS. 5 and 7, the fill tube 184 is positioned directly above the spout 152 of the pitcher 142. In other embodiments, the fill tube 184 may be in other locations suitable to allow the flow of fluid (e.g., water) into the pitcher volume 148. Fluid flow to the pitcher continues until a stop flow event occurs and the controller 200 receives a signal contraindicating the flow of liquid into the pitcher 142.

Figure 6:
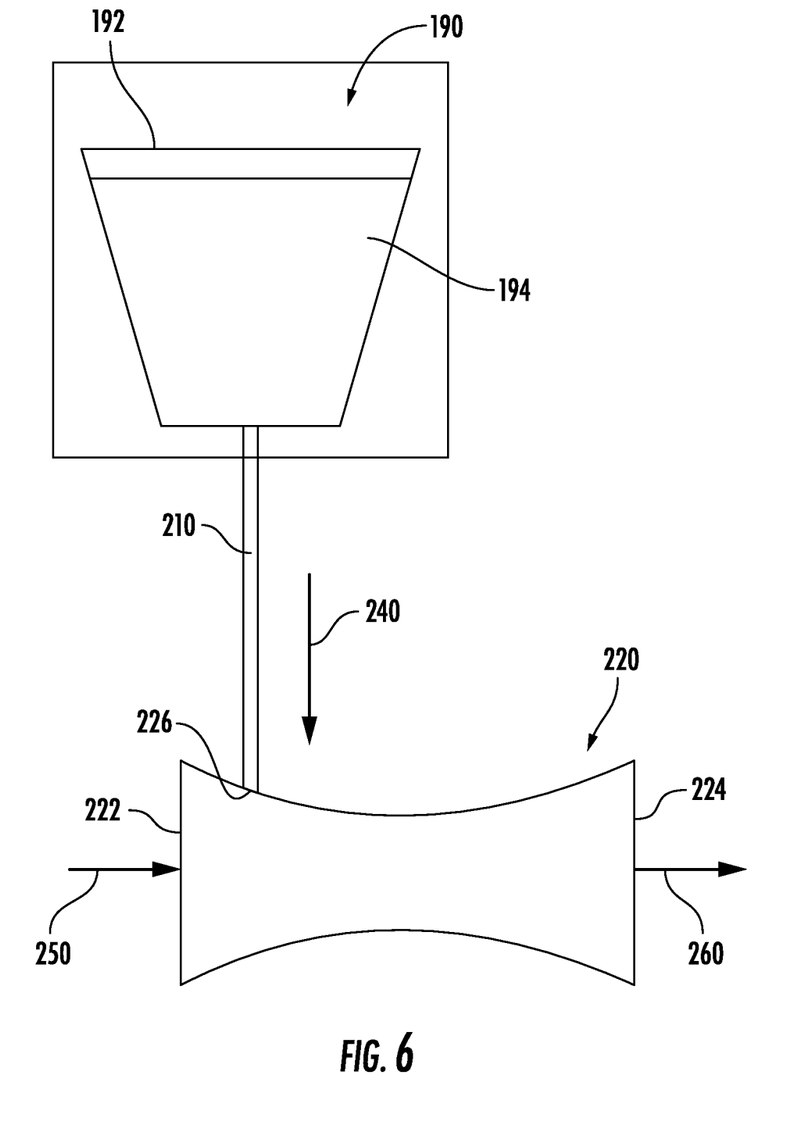
FIG. 6 provides a schematic illustration of some components of the dispenser of FIG. 5 according to one or more exemplary embodiments.
Figure 8:
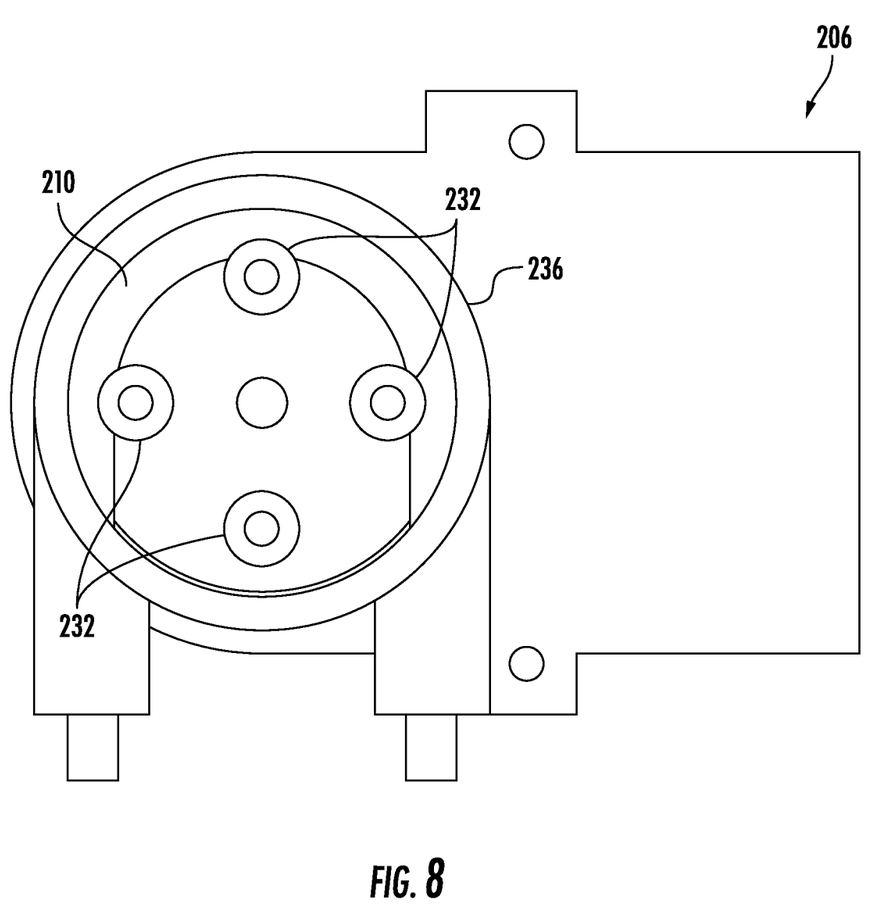
FIG. 8 provides a front elevation view of an exemplary dosing pump for a dispenser such as the exemplary dispenser of FIG. 7.
Figure 9:
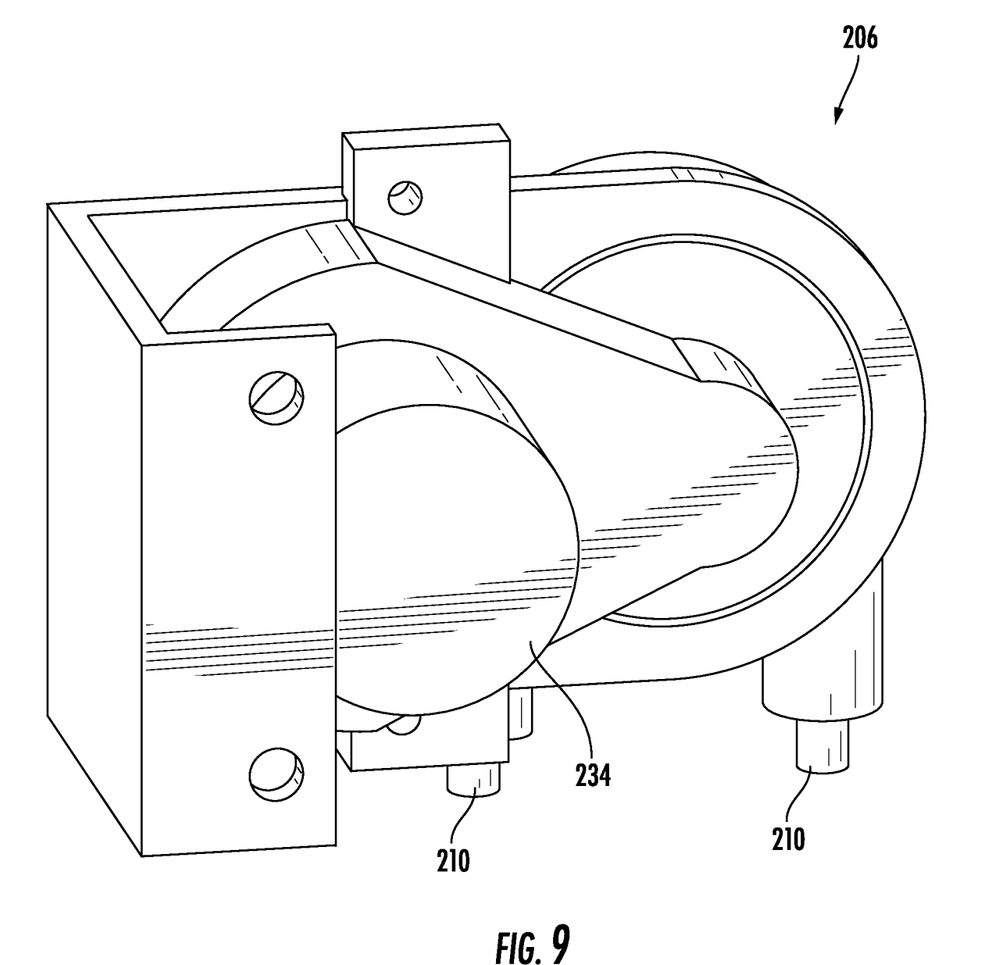
FIG. 9 provides a rear perspective view of the exemplary dosing pump of FIG. 8.
Figure 10:
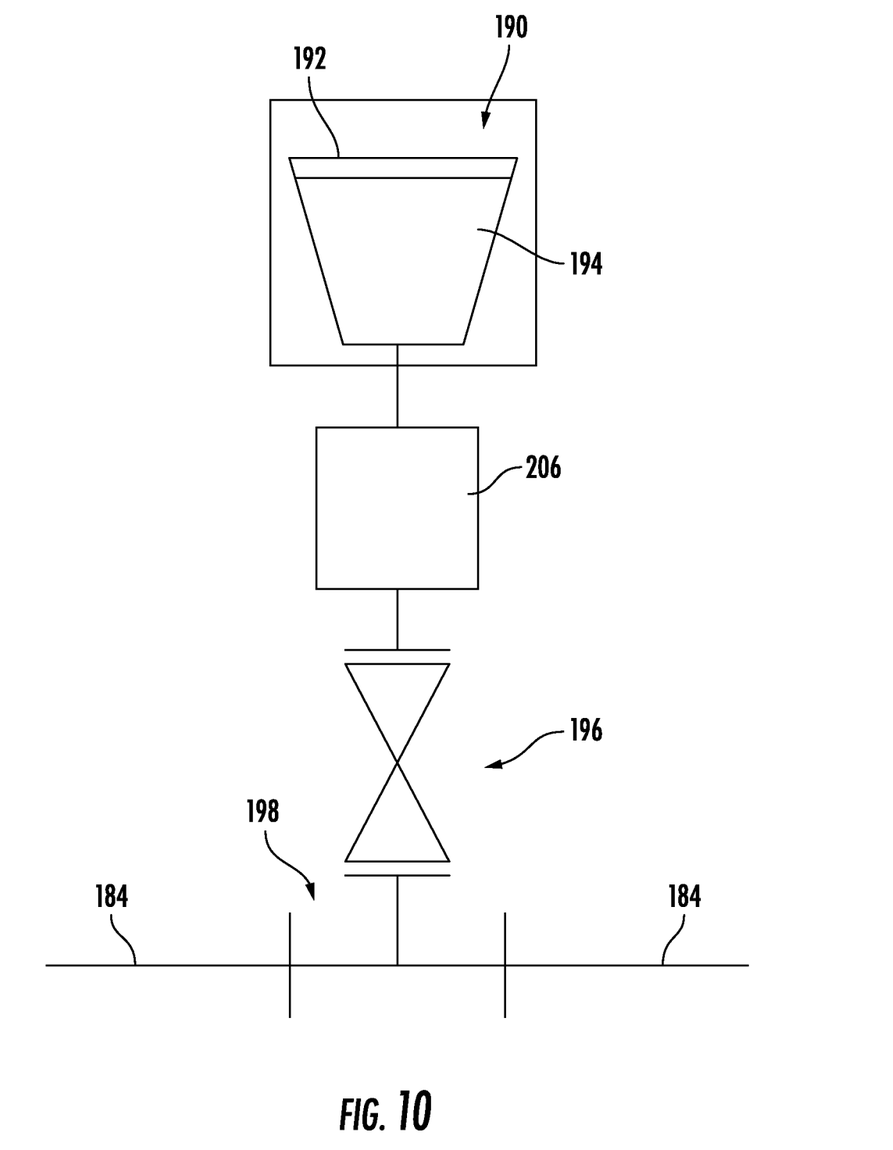
FIG. 10 provides a schematic illustration of some components of the dispenser of FIG. 7 according to one or more exemplary embodiments.

As may be seen generally throughout FIGS. 5 through 11, in some embodiments, the dispenser 180 may include a pod receiver 190. The pod receiver 190 may be configured to hold a pod 192 containing an additive 194 (FIGS. 6 and 10). In various embodiments, the pod receiver 190 may be in fluid communication with the internal volume 148 of the pitcher 142 whereby the dispenser 180 is configured to provide the additive 194 to the internal volume 148 of the pitcher 142. For example, in some embodiments, the pod receiver 190 may be coupled to a dispensing tube 210, and the additive 194 may flow from the pod 192 in the pod receiver 190 through the dispensing tube 210. The dispensing tube 210 may be coupled to the fill tube 184, whereby mixing of water and additive occurs at least partially in the fill tube 184 before reaching the pitcher 142, or the dispensing tube 210 may be in direct fluid communication with the pitcher 142, e.g., an end of the dispensing tube 210 may supply liquid additive to the internal volume 148 of the pitcher 142 without the liquid additive passing through any other intervening structures of the dispenser 180.

Referring now to FIGS. 5 and 6 specifically, in some embodiments, the dispenser 180 may include a venturi injector 220, and the dispensing tube 210 may be coupled to the fill tube 184 via the venturi injector 220. For example, as illustrated in FIG. 6, the dispensing tube 210 may be coupled between the pod receiver 190 and a suction port 226 of the venturi injector 220 and the venturi injector 220 may also be coupled with the fill tube 184. In such embodiments, the venturi injector 220 may include an inlet 222 and an outlet 224. The inlet 222 and the outlet 224 of the venturi injector 220 may be coupled in-line with the fill tube 184, whereby the flow of water 250 flows into the venturi injector 220 at the inlet 222. As the flow of water 250 moves through the venturi injector 220, a suction is created (due to the geometry of the venturi injector 220, as is understood by those of ordinary skill in the art), thereby drawing a flow of additive 240 into the venturi injector at the suction port 226, thereby injecting additive 194 from the pod receiver 190 into the flow of water 250 through the suction port 226. Thus, as the additive 240 and the water 250 flow to the outlet 224, the liquids mix within the venturi injector 220, thereby providing a flow of mixture 260 comprising water and the additive from the outlet 224 of the venturi injector 220.

Figure 11:
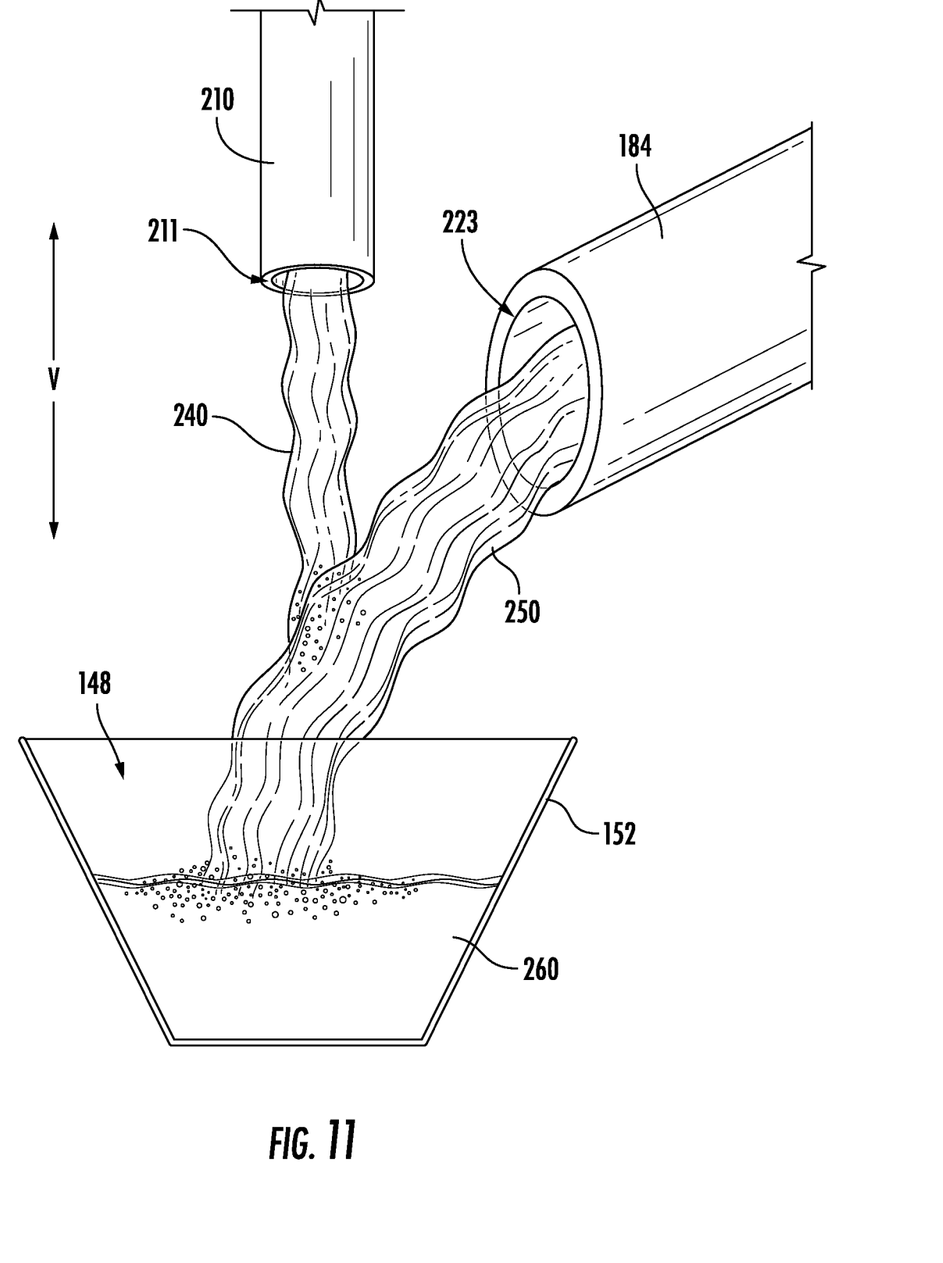
FIG. 11 provides a schematic illustration of an exemplary dispensing tube and an exemplary fill tube, along with exemplary liquid streams associated with each tube, as may be incorporated into an autofill dispenser in accordance with one or more embodiments of the present disclosure.

Referring now to FIGS. 7 through 11, in some embodiments, the dispenser 180 may include a dosing pump 206, and the dosing pump 206 may be operable and configured to urge additive 194 from the pod 192 in the pod receiver 190 to the pitcher 142, either via a portion of the fill tube 184 (e.g., as illustrated in FIGS. 7 and 10) or directly into the pitcher (e.g., as illustrated in FIG. 11).

As may be seen in FIGS. 7 and 10, in some embodiments, the dosing pump 206 may be positioned between the pod receiver 190 and the pitcher 142. The dispensing tube 210 may extend from the dosing pump 206 to the fill tube 184. For example, in such embodiments, the dispensing tube 210 may be coupled to the fill tube 184 by a tee fitting 198. Such embodiments may also optionally include a valve 196 between the pod receiver 190 and the tee fitting 198, such as at a port of the tee fitting 198, e.g., between the dosing pump 206 and the tee fitting 198. Thus, the autofill pitcher system 140 may, in such embodiments where the valve 196 is provided, be operable to selectively provide, e.g., dispense, water with or without the additive based on the position (open or closed) of the valve 196. That is, the valve 196 may be movable between an open position and a closed position, where the valve is configured to permit additive flow when in the open position and to obstruct additive flow when in the closed position. The valve 196 may also serve as a flow restrictor to provide additional control over the rate of additive dispensed to the pitcher 142, e.g., when the valve is in an intermediate position between open and closed.

Referring now to FIGS. 8 and 9, in some embodiments, the dosing pump 206 may be a peristaltic pump. For example, a segment of the dispensing tube 210 may extend through a housing 236 of the peristaltic pump 206, and the peristaltic pump 206 may include a plurality of rollers 232, each of which compresses a portion of the dispensing tube 210 between the roller 232 and the housing 236. The peristaltic pump 206 may further include a motor 234 (FIG. 9), such as a stepper motor, which is operable to rotate the rollers 232 within the housing 236 such that the rollers 232 progressively and sequentially compress portions of the dispensing tube 210, thereby urging the additive 194 from the pod 192 in the pod receiver 190 through the dispensing tube 210 and to the pitcher 142.

Turning now to FIG. 11, an end portion of the dispensing tube 210 and a stream of additive 240 emanating from an outlet 211 of the dispensing tube 210 are illustrated, as well as an end portion of the water fill tube 184 with a stream of water 250 emanating from an outlet 223 of the water fill tube 184. As may be seen in FIG. 11, the water fill tube 184 is oriented at an oblique angle to the vertical direction V, such that the stream of water 250, which flows to the water fill tube 184 at a generally constant pressure, defines an arcuate path outward from the end portion of the water fill tube 184 and downward along the vertical direction V under the combined influence of the upstream water pressure as the stream of water 250 exits the water fill tube 184 and the force of gravity on the stream of water 250.

The end portion of the dispensing tube 210 may be oriented generally along or parallel to the vertical direction V, such that the stream of additive 240 from the dispensing tube 210 flows generally straight down. In some embodiments, the end portion of the dispensing tube 210 may be centered over the center of the spout 152. The end portion of the dispensing tube 210 may be positioned directly in front of the end portion of the fill tube 184, e.g., along the flow direction of the stream of water 250. The outlet 211 of the dispensing tube 210 may be positioned above the outlet 223 of the fill tube 184. The outlet 211 of the dispensing tube 210 may be offset from the outlet 223 of the fill tube 184 generally along a horizontal direction, e.g., a direction perpendicular to the vertical direction V. The end portion of the dispensing tube 210 may be aligned along a tangent to the arcuate stream of water 250 from the fill tube 184. The stream of additive 240 and the stream of water 250 may intersect in the air, e.g., above the pitcher 142, such as above the spout 152 thereof, forming a mixture 260 of water and additive. The mixture 260 may be generated at least in part due to the intermixing of the streams 240 and 250 outside of (e.g., above) the pitcher 142 and at least in part due to kinetic energy of the falling stream as the liquid lands in the internal volume 148 of the pitcher 142. Thus, the outlet 211 of the dispensing tube 210 may be aligned with the outlet 223 of the fill tube 184 such that the flow of the liquid additive from the dispensing tube 210 mixes with the flow of liquid water from the fill tube 184 to form a mixed flow of liquid water and liquid additive.

As may be seen in FIG. 11, the size, e.g., inner diameter, of the dispensing tube 210 may be less than, such as about half of or less than half of, the size, e.g., inner diameter, of the fill tube 184. Additionally, the dosing pump 206 may be configured to provide a relatively slow velocity (e.g., low pressure) flow of additive through the dispensing tube 210. Thus, the rate of flow of the stream of additive 240 may be much lower than the rate of flow of the stream of water 250, such as the stream of additive 240 may be much smaller and slower than the stream of water 250. For example, the flows may be synchronized, such that the flow time during a fill is the same for both streams, while the stream of additive 240 may be much smaller and slower such that the additive may account for about two percent of the mixture 260 or less, such as about 1.5% or less, such as about 1% or less, such as about 0.5% or less.

Accordingly, the pitcher 142, e.g., the spout 152 and/or internal volume 148 thereof, may be positioned downstream of the dispensing tube 210 and downstream of the fill tube 184 when the pitcher 142 is received in the cavity 181. The pitcher 142 may be configured for receiving the mixed flow of liquid water and liquid additive such that the mixture 260 of liquid water and liquid additive is formed at least partially in the pitcher 142, e.g., the mixture 260 may be partially formed outside of the pitcher 142 as the liquid flows to the pitcher 142 (e.g., in the air) and further mixing may occur in the pitcher 142.

In some embodiments, the autofill pitcher system 140 may include more than one pod receiver 190. For example, the pod receiver 190 may be a first pod receiver configured to hold a first pod containing a first additive, and the dispenser 180 may further include a second pod receiver configured to hold a second pod containing a second additive. In such embodiments, multiple dosing pumps may be provided, such as one dosing pump for each pod receiver and a corresponding dispensing tube coupled to the pod receiver, with a one-to-one correspondence among the pumps, pod receivers, and dispensing tubes. In embodiments where multiple pod receivers are provided, each pod receiver may be coupled to the fill tube 184, such as at a cross fitting instead of a tee fitting, or with multiple fittings, such as two or more tee fittings and/or cross fittings in various combinations. Also in embodiments where multiple pod receivers are provided, each pod receiver may be coupled to a corresponding dispensing tube, and each dispensing tube may direct a flow of the respective additive directly to the pitcher 142, e.g., to the internal volume 148 thereof, at the spout 152 or any other suitable location on the pitcher 142.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

What is claimed is:

1. A refrigerator appliance comprising:
a cabinet defining a fresh food chamber;
an autofill pitcher system comprising:
a pitcher comprising at least one pitcher wall and an internal volume defined within the at least one pitcher wall;
a dispenser defining a cavity, the cavity configured to receive the pitcher, the dispenser comprising a fill tube and a pod receiver configured to hold a pod containing an additive, the fill tube positioned and configured to direct a flow of water from a water supply into the internal volume of the pitcher when the pitcher is received within the cavity, the pod receiver in fluid communication with the internal volume of the pitcher whereby the dispenser is configured to provide the additive to the internal volume of the pitcher; and
a dispensing tube extending from the pod receiver to an outlet of the dispensing tube, the outlet of the dispensing tube positioned and oriented to direct a flow of additive into the internal volume of the pitcher without the liquid additive passing through any other intervening structures of the dispenser.

2. The refrigerator appliance of claim 1, further comprising a dosing pump coupled to the pod receiver, wherein the dosing pump is configured to urge additive from the pod to the internal volume of the pitcher.

3. The refrigerator appliance of claim 2, further comprising a valve between the dosing pump and the internal volume of the pitcher, wherein the valve is movable between an open position and a closed position, the valve configured to permit additive flow when in the open position and to obstruct additive flow when in the closed position.

4. The refrigerator appliance of claim 2, wherein the dosing pump is a peristaltic pump.

5. The refrigerator appliance of claim 4, wherein the peristaltic pump is actuated by a stepper motor.

6. The refrigerator appliance of claim 1, wherein the pod receiver is a first pod receiver configured to hold a first pod containing a first additive, further comprising a second pod receiver configured to hold a second pod containing a second additive.

7. An autofill pitcher system comprising:
a pitcher comprising at least one pitcher wall and an internal volume defined within the at least one pitcher wall;
a dispenser defining a cavity, the cavity configured to receive the pitcher, the dispenser comprising a fill tube and a pod receiver configured to hold a pod containing an additive, the fill tube positioned and configured to direct a flow of water from a water supply into the internal volume of the pitcher when the pitcher is received within the cavity, the pod receiver in fluid communication with the internal volume of the pitcher whereby the dispenser is configured to provide the additive to the internal volume of the pitcher; and
a dispensing tube extending from the pod receiver to an outlet of the dispensing tube, the outlet of the dispensing tube positioned and oriented to direct a flow of additive into the internal volume of the pitcher without the liquid additive passing through any other intervening structures of the dispenser.

8. The autofill pitcher system of claim 7, further comprising a dosing pump coupled to the pod receiver, wherein the dosing pump is configured to urge additive from the pod to the internal volume of the pitcher.

9. The autofill pitcher system of claim 8, further comprising a valve between the dosing pump and the internal volume of the pitcher, wherein the valve is movable between an open position and a closed position, the valve configured to permit additive flow when in the open position and to obstruct additive flow when in the closed position.

10. The autofill pitcher system of claim 8, wherein the dosing pump is a peristaltic pump.

11. The autofill pitcher system of claim 10, wherein the peristaltic pump is actuated by a stepper motor.

12. The autofill pitcher system of claim 7, wherein the pod receiver is a first pod receiver configured to hold a first pod containing a first additive, further comprising a second pod receiver configured to hold a second pod containing a second additive.

* * * * *